US009053349B1

(12) United States Patent
White et al.

(10) Patent No.: US 9,053,349 B1
(45) Date of Patent: Jun. 9, 2015

(54) DIGITAL CORRELATOR / FIR FILTER WITH TUNABLE BIT TIME USING ANALOG SUMMATION

(71) Applicant: HRL Laboratories, LLC, Malibu, CA (US)

(72) Inventors: Randall White, Los Angeles, CA (US); Brian N. Limketkai, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/273,245

(22) Filed: May 8, 2014

(51) Int. Cl.
*G06F 7/44* (2006.01)
*G06G 7/16* (2006.01)
*G06G 7/04* (2006.01)

(52) U.S. Cl.
CPC ........................................ *G06G 7/04* (2013.01)

(58) Field of Classification Search
USPC .................................................. 327/356, 359
See application file for complete search history.

(56) References Cited

U.S. PATENT DOCUMENTS

| | | | | |
|---|---|---|---|---|
| 4,268,916 | A * | 5/1981 | Kusakabe | 455/333 |
| 4,831,602 | A * | 5/1989 | Kroenert et al. | 367/100 |
| 5,479,363 | A * | 12/1995 | Willson et al. | 708/319 |
| 5,568,150 | A * | 10/1996 | Taylor et al. | 342/189 |
| 6,407,694 | B1 * | 6/2002 | Cox et al. | 342/13 |
| 6,411,253 | B1 * | 6/2002 | Cox et al. | 342/194 |
| 6,441,781 | B1 * | 8/2002 | Rog et al. | 342/357.73 |
| 2010/0142604 | A1 * | 6/2010 | Azenkot | 375/229 |
| 2011/0158419 | A1 * | 6/2011 | Theverapperuma et al. | 381/71.1 |
| 2012/0099630 | A1 * | 4/2012 | Verhelst et al. | 375/224 |
| 2014/0254813 | A1 * | 9/2014 | Anderton et al. | 381/66 |

OTHER PUBLICATIONS

Dally & Poulton, "Digital Systems Engineering", Cambridge University Press; 1 edition, pp. 589-596, (Apr. 24, 2008).
Tomazaou, "Analogue IC design: the Current-Mode Approach", Institution of Engineering and Technology, pp. 297-326 and 503-514, (Dec. 1, 1993).
Bassett, Glasser, Rettberg in "Dynamic Delay Adjustment: A Technique for High Speed Asynchronous Communication," Proc 4$^{th}$ MIT Conf on Adv Research in VLSI; pp. 219-232 (Apr. 7-9, 1986).

* cited by examiner

*Primary Examiner* — Adam Houston
(74) *Attorney, Agent, or Firm* — Ladas & Parry

(57) ABSTRACT

A digital correlator including an input, a plurality of serially connected delay elements, wherein a first delay element of the plurality of serially connected delay elements is coupled to the input, a plurality of current elements, wherein each respective current element of the plurality of current elements is coupled to a respective delay element, and each current element has a current, and a summer for summing the currents of the plurality of current elements, the summer having an output for the digital correlator.

18 Claims, 2 Drawing Sheets

DIGITAL CORRELATOR / FIR FILTER WITH TUNABLE BIT TIME USING ANALOG SUMMATION

CROSS REFERENCE TO RELATED APPLICATIONS

None

STATEMENT REGARDING FEDERAL FUNDING

None

TECHNICAL FIELD

This disclosure relates to correlators and finite impulse response (FIR) filters.

BACKGROUND

In signal processing, correlation is a measure of similarity of two waveforms. For example, a received signal may be compared as it is received with a desired waveform. The response of the correlator is a function of the similarity of the waveforms and is maximized when there is an exact match between the received waveform and the desired waveform. A correlator may be efficiently implemented as a finite impulse response (FIR) filter.

Real-time correlators can be implemented via analog transversal filters such as analog tapped delay lines or surface acoustic wave (SAW) filters; however, these implementations suffer from inflexibility, because the analog tap delays or SAW filter weights cannot be adjusted. SAW devices also suffer bandwidth limitations.

Correlators can be implemented with digital logic; however, if the signal to be processed is an analog waveform, then a digital correlator requires an analog to digital converter (ADC) to convert the analog waveform to digital. A digital correlator requires more power and area, and operates at a lower speed than an analog correlator. However, when very high precision is required, a digital correlator may be superior to an analog correlator.

What is needed is a filter and correlator with adjustable tap delays and adjustable tap coefficients that is faster, that has requires less area and lower power than a full digital implementation, and that has a higher bandwidth than SAW filters, while offering the benefit of feature scaling as integrated circuit technology improves. The embodiments of the present disclosure answer these and other needs.

SUMMARY

In a first embodiment disclosed herein, a digital correlator comprises an input, a plurality of serially connected delay elements, wherein a first delay element of the plurality of serially connected delay elements is coupled to the input, a plurality of current elements, wherein each respective current element of the plurality of current elements is coupled to a respective delay element, and each current element has a current, and a summer for summing the currents of the plurality of current elements, the summer having an output for the digital correlator.

In another embodiment disclosed herein, a digital correlator comprises an input, a plurality of serially connected delay elements, wherein a first delay element of the plurality of serially connected delay elements is coupled to the input and each delay element has a respective output, and a current-switching digital to analog converter (DAC) having a plurality of digital inputs wherein each respective digital input is coupled to a respective output of a respective delay element.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
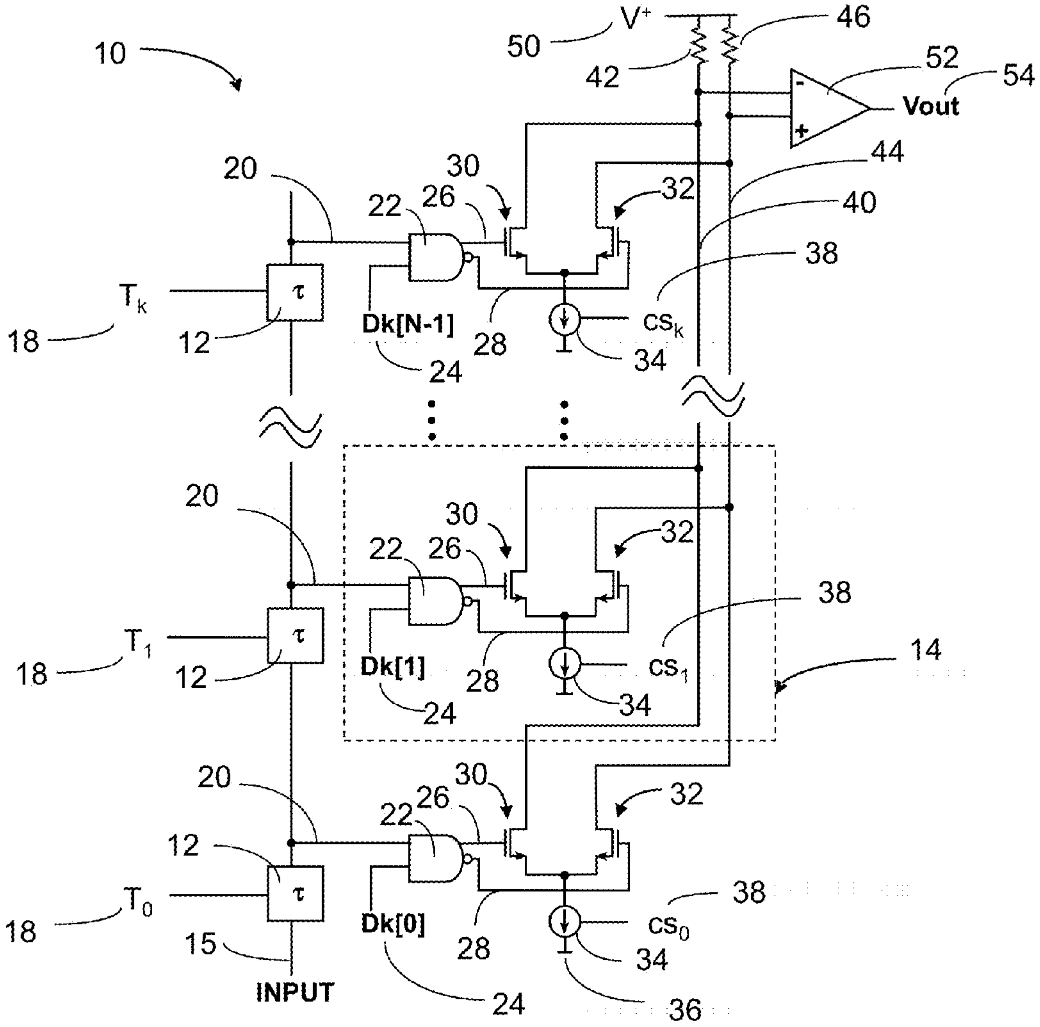
FIG. 1 shows a digital correlator/finite impulse response (FIR) filter in accordance with the present disclosure.

FIG. 1 shows a digital correlator/finite impulse response (FIR) filter 10 with tunable bit delay times using analog summation in accordance with the present disclosure.

The digital correlator/finite impulse response (FIR) filter 10 has an input 15 that feeds a tapped delay line made up of serially connected adjustable delay elements 12. Each adjustable delay elements 12 has an output 20 that is connected to an analog summation block made up of current elements 14, with each current element 14 connected to an output 20 from a respective delay element 12. The output currents of the current elements 14 are summed and the result is converted to a voltage output 54.

The current elements 14 may be implemented as a current-switching digital to analog converter (DAC), which is well known in the art, and the embodiment shown in FIG. 1 is one form of a current-switching digital to analog converter (DAC).

The delay of each delay element 12 may be adjusted or varied via a control 18. In one embodiment well known in the art, a delay element 12 may be implemented with digital logic gates. For example, the control 18 may control a multiplexer that selects between 2, 4, 6, 8, 10 or any other number of logic gates in series, such as 1, 2, 4, 8, and 16. If a logic gate has a delay of 1 nanosecond, for example, the multiplexer could select delays of 2, 4, 6, 8 or 10 nanoseconds, thereby providing an adjustable delay element 12. Such a digital variable delay element is well known in the art. Clearly, the delays may be shorter or longer depending on the components used. The delay elements 12 may also be implemented using other well-known circuits, including current-starved inverter delay lines, capacitor-loaded inverter delay lines, and differential delay elements. Such delay circuits are commonly used in delay-locked loops (DLLs), duty-cycle correctors, clock conditioning circuits, and phase/timing adjustment circuits. Delay circuits are further described by Dally & Poulton in “Digital Systems Engineering” Cambridge University Press; 1 edition (Apr. 24, 2008), and by Bassett, Glasser, Rettberg in “Dynamic Delay Adjustment: A Technique for High Speed Asynchronous Communication," Proc 4$^{th}$ MIT Conf on Adv Research in VLSI, which are incorporated by reference as though set forth in full.

The digital correlator/finite impulse response (FIR) filter 10 may have N variable delay elements 12 and N current elements 14. The following is a description of the nth delay element 12 and nth current element 14.

The delay elements 12 are connected in series, such that the nth variable delay element 12 is connected in series to the n−1 variable delay element 12 and to the n+1 variable delay element 12. The nth variable delay element 12 is connected to the nth current element 14 by an output 20 from the nth delay element 12.

Each delay element 12 has an output 20 which is one input to an AND gate 22 and the second input to the AND gate 22 element 14 is a control $D_k(n)$ 24, which is binary control. If the control $D_k(n)$ 24 is a logic "1", then the nth current element is effectively enabled and the current from the nth current element is a function of the output 20 from the delay element 12. If the control $D_k(n)$ 24 is a logic "0", then the nth current element is effectively disabled and the current from the nth current element is not a function of the output 20 from the delay element 12.

The AND gate 22 in the nth current element has a noninverted output 26 and an inverted output 28. The noninverted output 26 is connected to a gate of a field effect transistor 30. The inverted output 28 is connected to a gate of a field effect transistor 32. The drains of field effect transistors 30 and 32 are connected together and are connected to a current source 34, which is connected to ground 36. The current source 34 in the nth current element 14 may have a variable or adjustable current, which may be controlled by current source control 38.

In one embodiment the current sources 34 in all the N current elements may be set to the same current. In another embodiment the current source 34 in the nth current element 14 may be set to have a binary weighted current, such that the current for the current source 34 in the nth current element 14 is set to $2^n$ times the current for the current source 34 in the 0$^{th}$ current element 14. The current sources 34 may also be set to arbitrary or variable currents.

Implementations for the adjustable/variable current sources 34 include summing a set of unit or binary-scaled current sources with differential pair switches, which may be implemented in a manner similar to a current-steering DAC, digitally adjustable current mirrors, and switched-current techniques. Switched-current circuits and dynamic current mirrors are described by Tomazaou in "Analogue IC design: the Current-Mode Approach" Institution of Engineering and Technology (Dec. 1, 1993), which is incorporated by reference as though set forth in full.

The sources of all the field effect transistors 30 are connected together to line 40 and connected to a resistor 42, which is connected to a voltage $V^+$ 50. The sources of all the field effect transistors 32 are connected together to line 44 and connected to a resistor 46, which is also connected to the voltage $V^+$ 50. The resistors 42 and 46 convert the sum of the currents from the current elements 14 to a voltage. The lines 40 and 44 are connected to a negative and positive input, respectively, of a differential amplifier 52, which has an output Vout 54. A person skilled in the art would understand that lines 40 and 44 may be connected instead to the positive and negative input, respectively, of the differential amplifier 52.

A person skilled in the art would understand that the nth current element may also be implemented with bipolar transistors instead of field effect transistors. In that case the FET gates may instead be bases, the FET drains may instead be emitters, and FET sources may instead be collectors.

Figure 2:
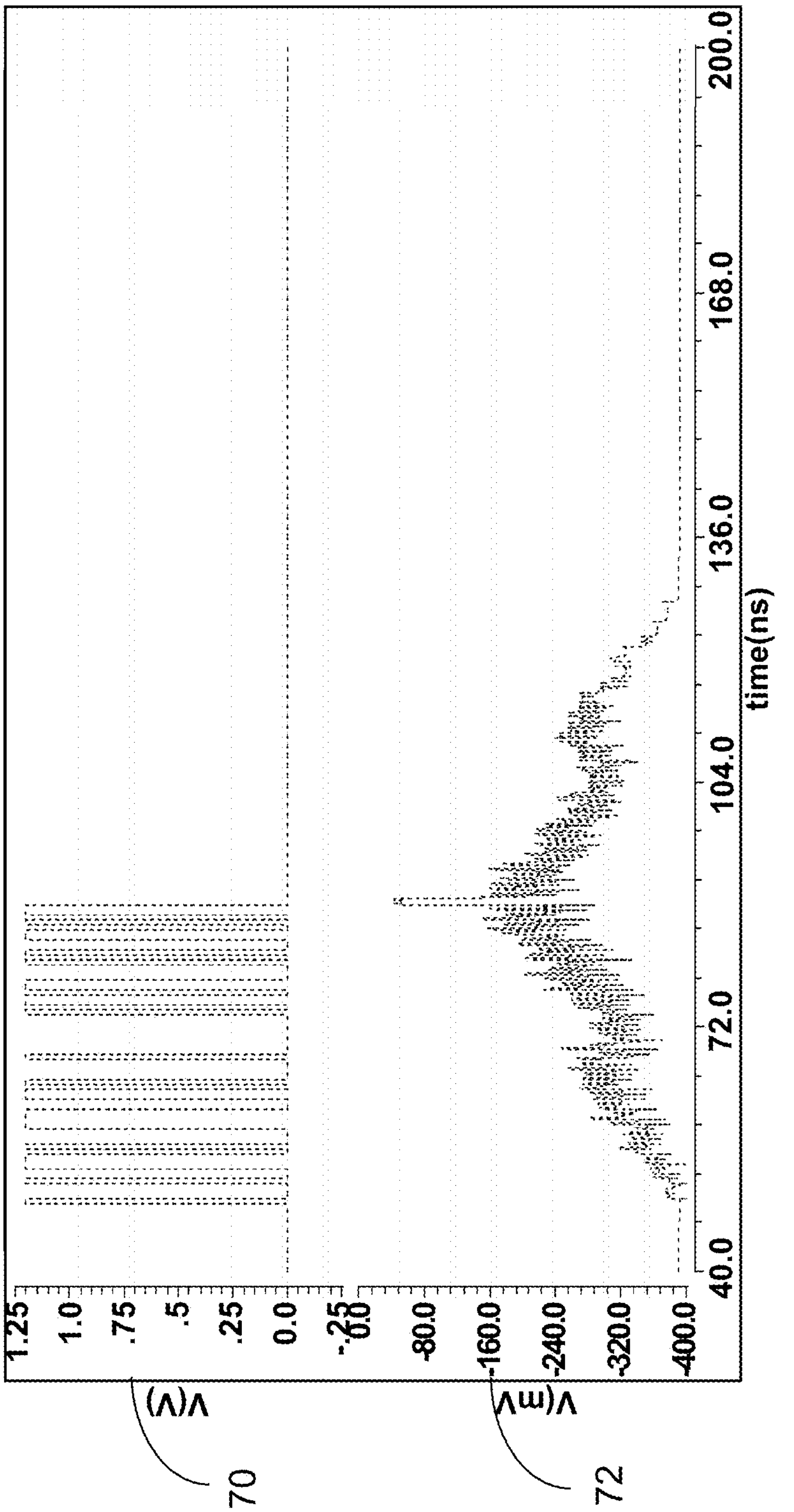
FIG. 2 shows an autocorrelation response of a digital correlator/finite impulse response (FIR) filter to a coded input waveform in accordance with the present disclosure.

A digital input on input 15 to the serially connected delay elements 12 results in an output on output 54. FIG. 2 shows an example autocorrelation response 72 at output 54 for a 60-bit coded input 70 on input 15. The autocorrelation peak for the digital correlator/finite impulse response (FIR) filter 10 is evident in response 72.

The digital correlator may be tuned to have different responses by varying the delays of the delay elements 12 with controls 18, by varying the currents in the current sources 34 with current source controls 38, and by controlling which current elements 14 are effectively enabled with controls $D_k(n)$ 24.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A digital correlator comprising:

an input;

a plurality of serially connected delay elements, wherein a first delay element of the plurality of serially connected delay elements is coupled to the input;

a plurality of current elements, wherein each respective current element of the plurality of current elements is coupled to a respective delay element, and each current element has a current; and a summer for summing the currents of the plurality of current elements, the summer having an output for the digital correlator.

2. The digital correlator of claim 1 wherein:

the plurality of current elements and the summer comprise a current-switching digital to analog converter (DAC).

3. The digital correlator of claim 1 wherein:

each delay element has a variable delay.

4. The digital correlator of claim 2 wherein:

each delay element comprises a digital delay.

5. The digital correlator of claim 1 wherein:

each current element has a variable current.

6. The digital correlator of claim 1:

wherein the digital correlator comprises N delay elements and N current elements; and wherein the delay elements are connected in series, such that an nth delay element is connected in series to an n−1 variable delay element and to an n+1 variable delay element.

7. The digital correlator of claim 6 wherein:

an output from the nth delay element is connected to an nth current element by an output from the nth delay element connected to an input of an AND gate;

a binary control connected to another input of the AND gate;

wherein a binary state of the binary control determines whether or not the current from the nth current element is a function of the output from the delay element.

8. The digital correlator of claim 7 wherein for the nth current element:

the AND gate has a noninverted output and an inverted output;

the noninverted output is connected to a gate of a first field effect transistor;

the inverted output is connected to a gate of a second field effect transistor; and a drain of the first field effect transistor and a drain of the second field effect transistor are connected together and are connected to a current source.

9. The digital correlator of claim 8 wherein:

the current source may be have a variable or adjustable current.

10. The digital correlator of claim 9 wherein:

the current sources in all N current elements have a same current, or the current source in the nth current element has a current $2^n$ times a current for the current source in a $0^{th}$ current element.

11. The digital correlator of claim 8 wherein:

a source of the first field effect transistor of the current element is connected to a source of each other first field effect transistor of the N current elements and to a first resistor;

a source of the second field effect transistor of the current element is connected to a source of each other second field effect transistor of the N current elements and to a second resistor; and the first and second resistors are connected to a voltage.

12. The digital correlator of claim 11 further comprising:

a differential amplifier having a first and a second input and an output for the digital correlator;

wherein the first input is connected to the sources of the first field effect transistors; and wherein the second input is connected to the sources of the second field effect transistors.

13. A digital correlator comprising:

an input;

a plurality of serially connected delay elements, wherein a first delay element of the plurality of serially connected delay elements is coupled to the input and each delay element has a respective output; and a current-switching digital to analog converter (DAC) having a plurality of digital inputs wherein each respective digital input is coupled to a respective output of a respective delay element.

14. The digital correlator of claim 13 wherein:

each delay element has a variable delay.

15. The digital correlator of claim 13 wherein:

each delay element comprises a digital delay.

16. The digital correlator of claim 13 wherein:

the current-switching digital to analog converter (DAC) comprises a plurality of current elements each having a variable current.

17. The digital correlator of claim 13 wherein:

the current elements each have a same current, or the the current elements each have a current such that an nth current element has a current $2^n$ times a current in a $0^{th}$ current element.

18. The digital correlator of claim 13 wherein:

the current-switching digital to analog converter (DAC) comprises a plurality of current elements each having a control to enable or disable the current element.

* * * * *